(12) United States Patent
Akao et al.

(10) Patent No.: US 6,990,331 B2
(45) Date of Patent: Jan. 24, 2006

(54) MOBILE TERMINAL

(75) Inventors: Masahide Akao, Kyotanabe (JP); Masayoshi Masuda, Sakai (JP); Michiyuki Yamaoka, Katano (JP); Kiyoshi Okada, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 541 days.

(21) Appl. No.: 09/898,044

(22) Filed: Jul. 5, 2001

(65) Prior Publication Data

US 2002/0006783 A1 Jan. 17, 2002

(30) Foreign Application Priority Data

Jul. 11, 2000 (JP) .................................. 2000-209275

(51) Int. Cl.
*H04M 11/10* (2006.01)

(52) U.S. Cl. .................... 455/412.1; 455/466; 455/566; 340/7.51; 340/7.52

(58) Field of Classification Search ............ 455/412.1, 455/412.2, 566, 567, 466; 340/7.51, 7.52, 340/7.55, 7.56
See application file for complete search history.

(56) References Cited

U.S. PATENT DOCUMENTS

| 4,835,777 A | * | 5/1989 | DeLuca et al. ............. 714/822 |
| 5,173,688 A | * | 12/1992 | DeLuca et al. ............. 340/7.55 |
| 5,384,565 A | | 1/1995 | Cannon ................. 340/825.44 |
| 5,410,302 A | * | 4/1995 | Dulaney et al. ........... 340/7.52 |
| 5,436,620 A | * | 7/1995 | Ide ............................ 340/7.52 |
| 5,493,285 A | * | 2/1996 | Yoshizawa ................. 340/7.51 |
| 6,067,444 A | * | 5/2000 | Cannon et al. ............ 340/7.44 |
| 6,154,147 A | * | 11/2000 | Gabrielle et al. .......... 340/7.52 |
| 6,330,436 B1 | * | 12/2001 | Zidel ....................... 455/412.2 |

FOREIGN PATENT DOCUMENTS

| JP | 07-319897 | 12/1995 |
| JP | 10-011509 | 1/1998 |
| JP | 10-222438 | 8/1998 |
| JP | 10-232815 | 9/1998 |
| JP | 2000-3321 | 1/2000 |

OTHER PUBLICATIONS

Copy of Japanese Office Action dated May 31, 2005 92 pages).
Japanese Office Action dated Dec. 2, 2003.

* cited by examiner

*Primary Examiner*—Temica Beamer
(74) *Attorney, Agent, or Firm*—Armstrong, Kratz, Quintos, Hanson & Brooks, LLP

(57) ABSTRACT

With a mobile terminal which is adapted to receive a message transmitted by radio through the telephone network and to store the message in the nonvolatile member and to show the message on a display, when energized, checksum for the message stored in the nonvolatile memory is calculated to store the result in a RAM. When a message is thereafter received, checksum for the received message is compared with a plurality of checksums stored in the RAM, respectively. The subject to be compared is the only stored message having the same checksum as that for the received message, and the messages are compared. When the messages are same, the received message is stored in the nonvolatile memory by overwrite. As a result, a check for a message duplicate can be performed within a shorter period of time.

6 Claims, 5 Drawing Sheets

MOBILE TERMINAL

BACKGROUND OF THE INVENTION

The present invention relates to mobile terminals such as portable telephones, and more particularly to a mobile terminal which is adapted to receive a message from a sender to have the mail shown on a display.

DESCRIPTION OF THE RELATED ART

Portable telephones are conventionally provided with an E-mail function, and a short message service (SMS) is provided as one of services of the E-mail functions. With the short message service, a portable telephone can send and receive a message having a data size of about several hundred bytes. Tens to hundreds of messages received can be stored in a nonvolatile memory in the portable telephone.

According to a procedure shown in FIG. 5, a new message received is compared with past messages stored in the nonvolatile memory, respectively, to avoid storing a duplicate message because a message sent by the short message service may include a message with the same content.

In step S21 shown in FIG. 5, an inquiry is made as to whether the comparison of a new message with each message stored in the memory is completed. If the answer is negative, step S22 follows to read one stored message from the nonvolatile memory. Step 523 inquires whether the stored message has the same content as the message received. If the inquiry is answered in the negative, the sequence returns to step S21 to repeat the read and comparison of the message. When the same message exists and the inquiry is answered in the affirmative in step S23, step S24 follows to overwrite the memory with the message received. When the same message does not exist and the inquiry is answered in the affirmative in step S21, step 525 follows to store the message received as a new message in the memory. This obviates the likelihood that messages with the same content are duplicate-stored in the nonvolatile memory to save memory storage capacity.

However, the capacity of the nonvolatile memory installed in the portable telephone has become larger in recent years, increasing the number of short messages and data size of one message to be received, so that there is a problem of taking much time to check for a duplicate message. For instance, when receiving a short message, a response that the message is stored in the nonvolatile memory must be returned within a predetermined period of time (e.g., within 0.5 second). In this case, much time will be taken to check for a duplicate message, and thus the response cannot be returned within the predetermined period of time.

SUMMARY OF THE INVENTION

An object of the present invention is to provide a mobile terminal which is adapted to check for a duplicate message within a short period of time.

The mobile terminal of the invention comprises a receiving circuit for receiving a message having text data transmitted by radio through the telephone network, a display for showing a message received, a memory circuit for storing a message received, and a control circuit for controlling operation of the receiving circuit and the memory circuit.

The control circuit comprises:

means for preparing check data by performing a predetermined operation expression to text of a received message and/or to a telephone number of a message sender, check data comparison means for comparing check data prepared for a received message with check data prepared for a message stored in the memory circuit in receiving the message, and indicating whether the two check data are same, first message storing control means for comparing only a received message having the same check data as check data for a message stored in the memory circuit with the stored message having the same check data, and when the two messages are not same, newly registering the received message in the memory circuit, second message storing control means for storing, in the memory circuit, a received message having check data different from any check data for the stored messages without comparison of the messages.

With the mobile terminal described, the check data for the received message is compared with the check data for the stored message before the received message is compared with the stored message. The comparison of these check data can be performed within a shorter period of time than the comparison of the messages because the check data is smaller than the messages in data size. If two messages have different check data, the two messages are always different. If two messages have the same check data, the messages have high probability of being the same.

Accordingly, a check for a message duplication is given only to stored messages which have the same check data as the check data for the received message, so that the number of stored messages to be compared can be reduced greatly. This enables a check for a message duplication to be completed within a shorter period of time than conventionally.

Stated specifically, checksum for the received message or exclusive-OR for binary data of the received message can be used as the check data described. As a result, the check data can be calculated within a shorter period of time.

With the means for preparing check data described, when energized, check data can be prepared respectively for all stored messages in the memory circuit, and when a message is thereafter received, check data for the received message can be prepared. Accordingly, when a message is received, one check data for the received message is prepared, whereby time required for processing the check for duplication can be shortened.

Stated more specifically, the memory circuit described comprises a first memory for storing received messages and a second memory for storing the check data. The second memory is higher than the first memory in access speed. A memory of a low access speed is generally less expensive, and that of a high access speed is more expensive. Thus, the specific construction described above ensures data read processing at a higher speed and a cost reduction.

With the mobile terminal embodying the present invention as described above, check for a message duplication between the received message and the stored message can be performed within a shorter period of time, with the result that the response that the received message is stored can be returned quickly.

DETAILED DESCRIPTION OF THE PREFERRED EMBODIMENTS

Figure 1:
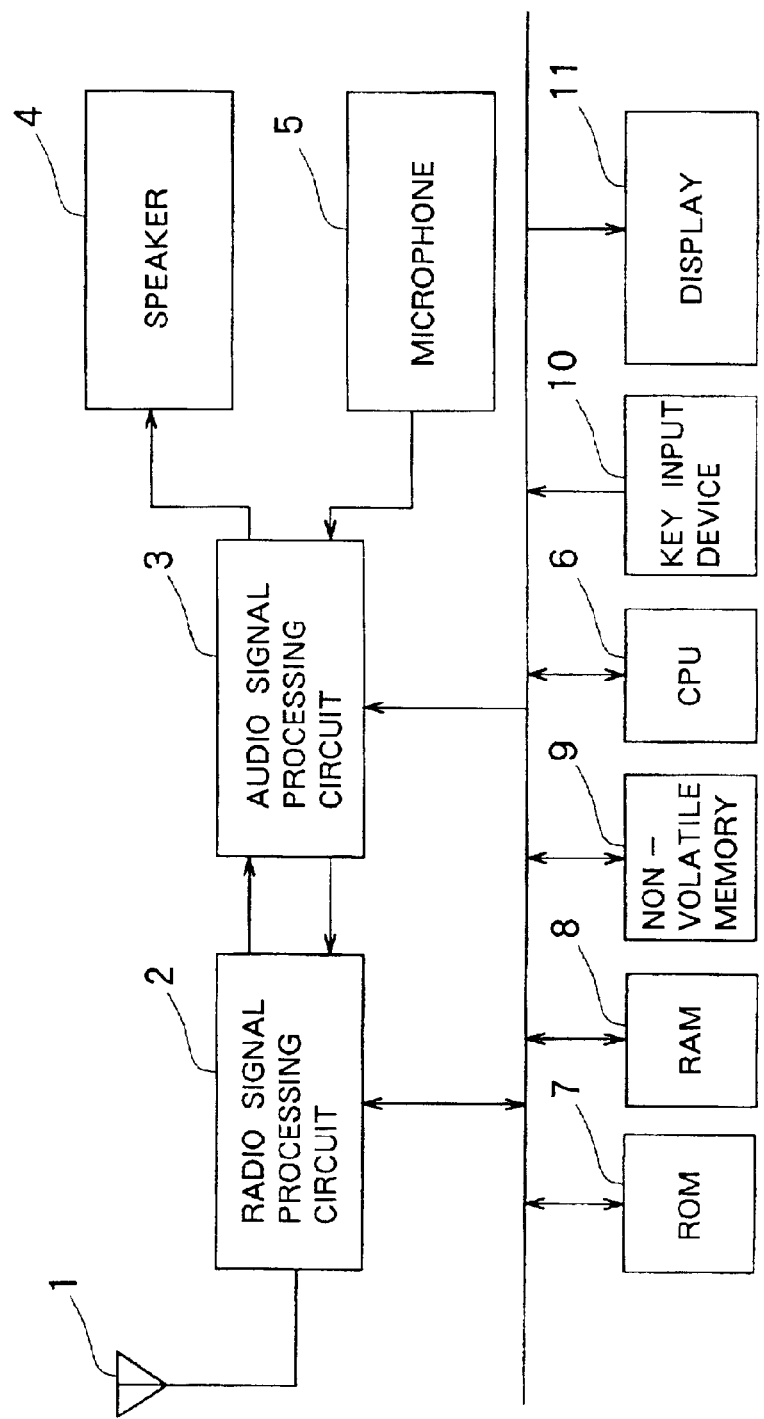
FIG. 1 is a block diagram showing the construction of a portable telephone embodying the present invention.

With reference to the drawings, a detailed description will be given below of the present invention as embodied for a portable telephone. A portable telephone embodying the present invention comprises, as shown in FIG. 1, a radio signal processing circuit 2 which is connected to an antenna 1 and receives and transmits radio signals, an audio signal processing circuit 3 for modulating/demodulating audio signals, a speaker 4 for outputting speech receiving sound, a microphone 5 for inputting speech transmitting sound, a key input device 10 for inputting a telephone number or a message, a display 11 for showing a telephone number or a message, a CPU 6 for executing various control operations, a ROM 7 for storing various control programs, a static RAM 8 used for processing of the CPU 6, a nonvolatile memory 9 for storing a received message, etc.

Figure 2:
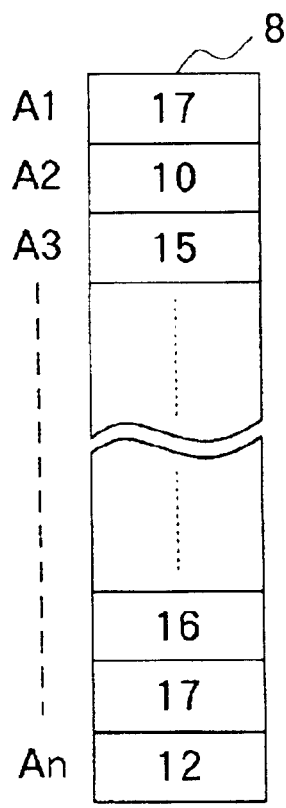
FIG. 2(a) and FIG. 2(b) are diagrams explaining data stored in a RAM and a nonvolatile memory of a portable telephone of the present invention.
Figure 2:
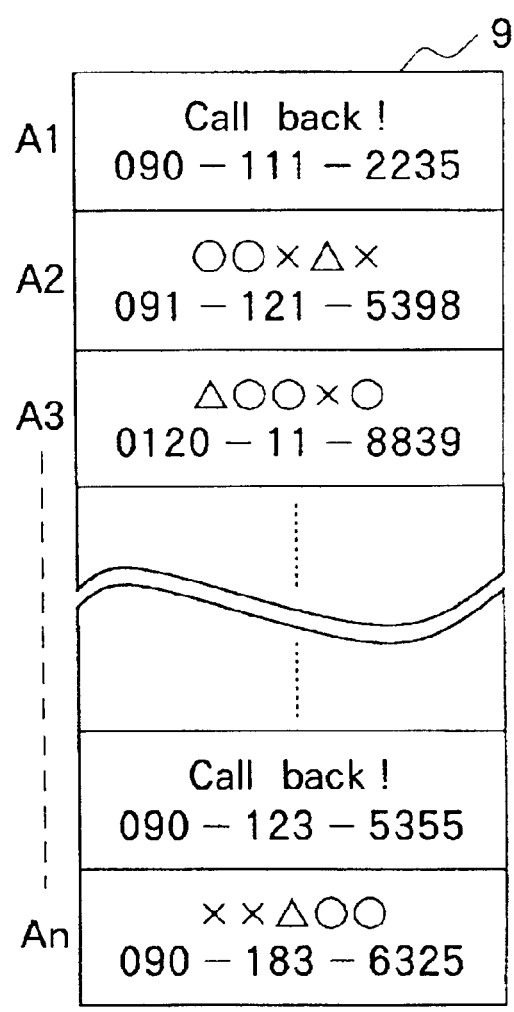

The portable telephone of the invention can be provided with a short message service. A received message is shown on the display 11, and is stored in a table in the nonvolatile memory 8, as shown in FIG. 2(b). As will be described below, an inquiry is made as to whether stored messages in the nonvolatile memory 9 have any duplication of the received message, to avoid storing a duplicate message from the same sender.

With the portable telephone of the present invention, specifically, when energized, a checksum for text of a message is calculated for each message stored (stored message) in the nonvolatile memory 9 in order to shorten the time required for a check for a duplicate. When a message is thereafter received, a checksum for text of a message is calculated for the message (received message). A stored message having a different checksum from that for the received message need not be checked for a duplicate. Checksum calculated for each message stored in the nonvolatile memory 9 is stored in a table in the RAM 8, as will be described below.

Figure 3:
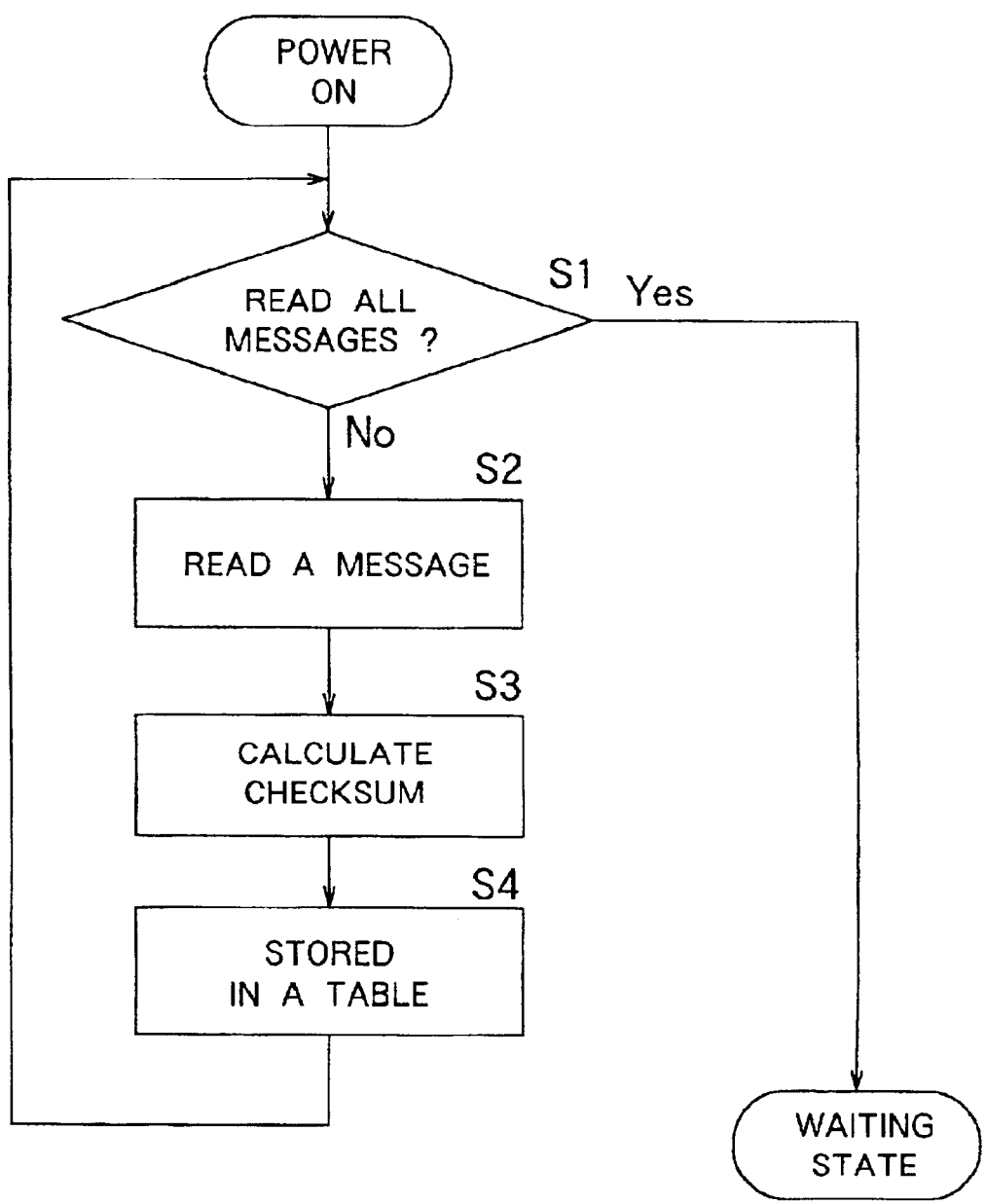
FIG. 3 is a flow chart showing the operation when a portable telephone of the present invention is energized.

FIG. 3 shows a procedure to be executed when the portable telephone is energized. In step S1, an inquiry is made as to whether reading of all messages from the nonvolatile memory 9 is completed for the calculation of checksum. When the answer is negative, step S2 follows to read a message from the nonvolatile memory 9. Subsequently, step S3 calculates a checksum for character code (e.g., ASCII) constituting a text of the message. Next in step S4, the resulting checksum is stored in a table in the RAM 8, the sequence returns to step S1 to calculate and store a checksum for each stored message. When step S1 is answered in the affirmative, the sequence follows to a state in waiting for receiving a message.

Consequently, as shown in FIG. 2(a), the resulting checksum is stored in the RAM 8 for each message stored in the nonvolatile memory 9 shown in FIG. 2(b). A stored address for each checksum in the RAM 8 is related to each other with a stored address for the corresponding message in the nonvolatile memory 9.

Figure 4:
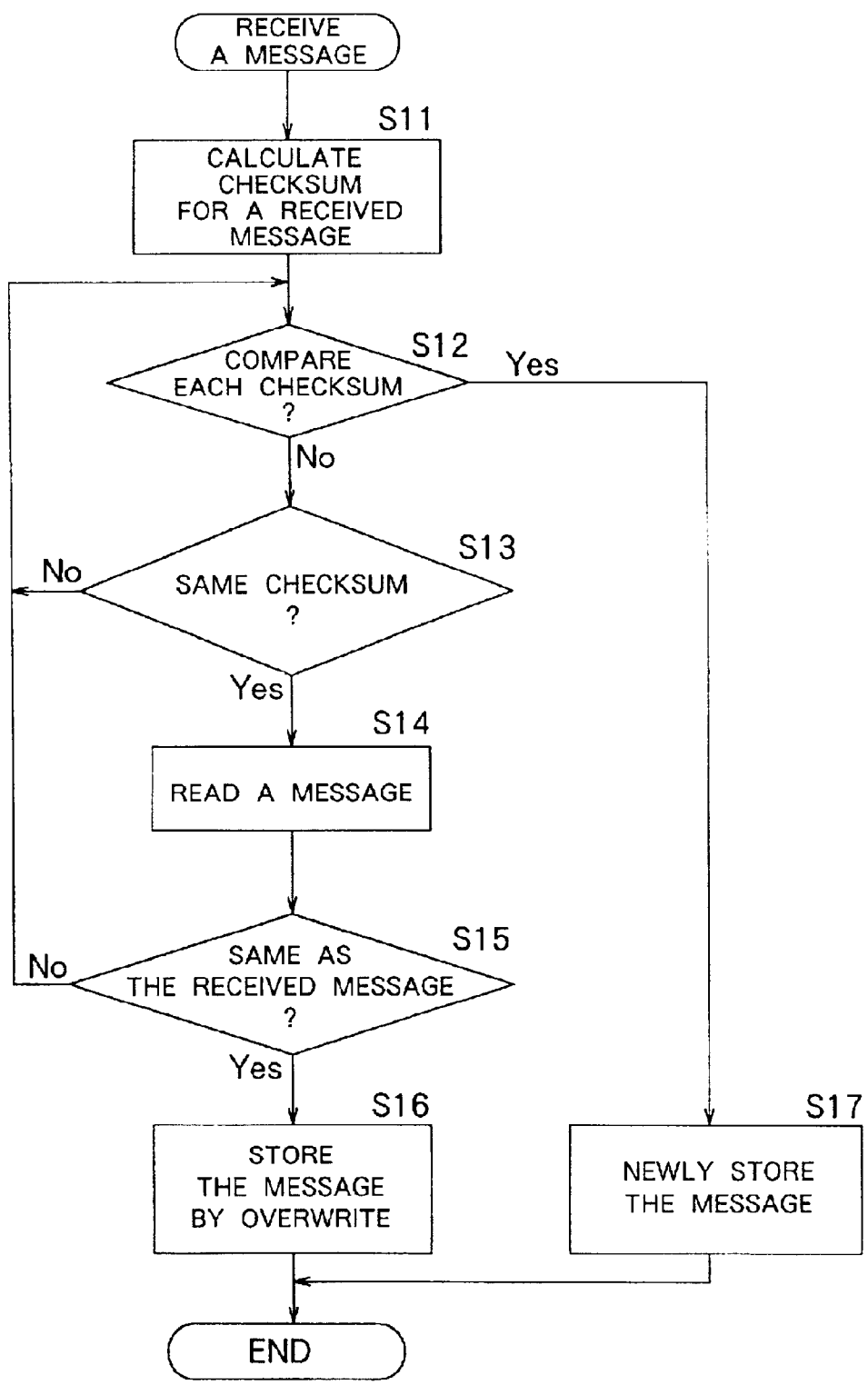
FIG. 4 is a flow chart showing the operation when a portable telephone of the present invention receives a message.
Figure 5:
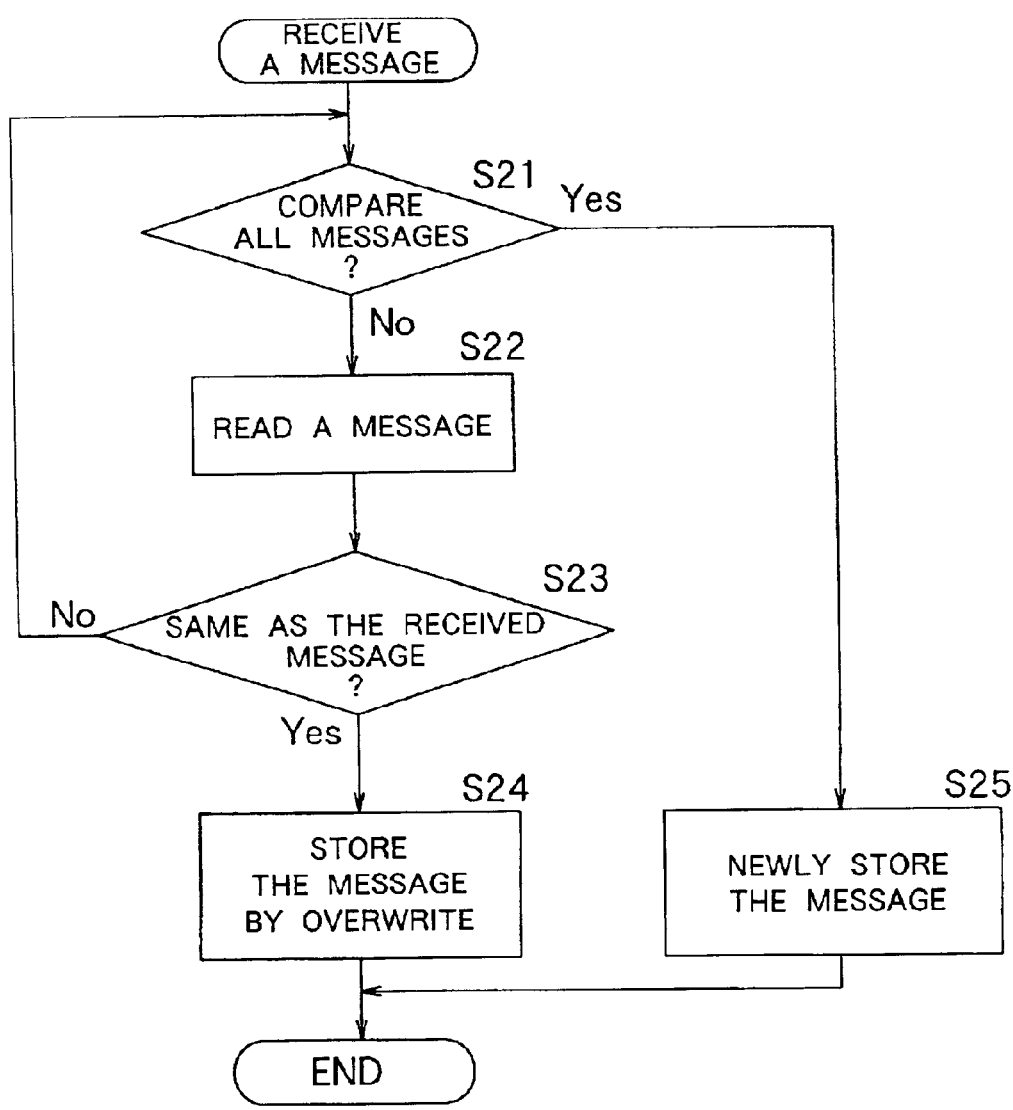
FIG. 5 is a flow chart showing the operation when a conventional portable telephone receives a message.

FIG. 4 shows a procedure to be executed when a message is received. In step S11, checksum for the received message is calculated. In step 512, an inquiry is made as to whether comparison of each checksum stored in the RAM 8 with that for the received message is completed. If the answer is negative, step 513 follows to inquire whether the checksum for the received message is the same as one checksum stored in the RAM 8. If the answer is negative, the sequence returns to step S12 to repeat the comparison with the next checksum stored in the RAM 8.

If the answer is affirmative in Step S13, step S14 follows to read a stored message from the nonvolatile memory 9 which has the same checksum as that for the received message to inquire whether the received message (text of the message and a telephone number of a sender) is the same as the stored message (text of the message and a telephone number of a sender).

If the answer is negative in step S15, the sequence returns to step S12 to repeat the comparison of checksums and the comparison of the messages. When the answer is in the affirmative in step S15, step S16 then follows to store the received message in the nonvolatile memory 9 by overwriting. As a result, only the date and time when the message is received is updated in the nonvolatile memory 9, and text of the message and the telephone number of the sender are not changed. On the other hand, when the answer is in the affirmative in step S12, step S17 follows to newly store the received message in the nonvolatile memory 9 to complete the procedure.

With the procedure described above, storing the duplicate message in the nonvolatile memory 9 is avoided, so that the memory capacity is saved. The checksum is about several bytes in data size so as to not squeeze the capacity of the RAM 8. Because the received message is compared with the stored message only when the checksum for the two messages is the same, processing time is shortened much more than when the received message is compared with each stored message as to duplication.

The device of the present invention is not limited to the foregoing embodiment in construction but may be modified variously by one skilled in the art without departing from the spirit of the invention as set forth in the appended claims. For example, the checksum for text of the message is calculated according to the embodiment described, but a field for calculating the checksum is not limited to the above, and the checksum can also be calculated for both text of the message and the telephone number of the sender. Further, exclusive-OR can also be calculated instead of the checksum.

The processing can be performed at a much higher speed by sorting values of plurality of checksums stored in the RAM 8 as to size and making binary search for the checksum.

What is claimed is:

1. A mobile terminal including a receiving circuit for receiving a message having text data transmitted by radio through a telephone network, a display for showing a message received, a memory circuit for storing a message received, and a control circuit for controlling operation of the receiving circuit and the memory circuit, the control circuit comprising:

means for preparing check data by performing a predetermined operation expression to data for one or a plurality of predetermined fields out of a plurality of fields constituting a received message;

check data comparison means for comparing the check data prepared for a received message with check data prepared for a message stored in the memory circuit in receiving the message, and indicating whether the two check data are the same;

first message storing control means for comparing only a received message having the same check data as a check data for a message stored in the memory circuit with a stored message having the same check data, and when the two messages are not same, newly registering the received message in the memory circuit; and second message storing control means for newly storing, in the memory circuit, a received message having check data different from check data for any stored message without comparison of the messages.

2. A mobile terminal according to claim 1, wherein the first message storing means stores a received message by overwriting when the two messages are the same as a result of the comparison.

3. A mobile terminal according to claim 1, wherein the means for preparing check data performs a predetermined operation expression to text of a received message and/or to a telephone number of a message sender, and prepares check data.

4. A mobile terminal according to claim 1, wherein the means for preparing check data calculates a checksum as check data.

5. A mobile terminal according to claim 1, wherein the means for preparing check data prepares check data for each message stored in the memory circuit when energized, and prepares check data for the received message when a message is thereafter received.

6. A mobile terminal according to claim 1, wherein the memory circuit comprises a first memory for storing the received message and a second memory for storing the check data, and the second memory has a higher access speed than the first memory.

* * * * *